(No Model.) 5 Sheets—Sheet 2.
A. BRUEGGER, Jr.
WATER TOWER TRUCK.
No. 383,699. Patented May 29, 1888.
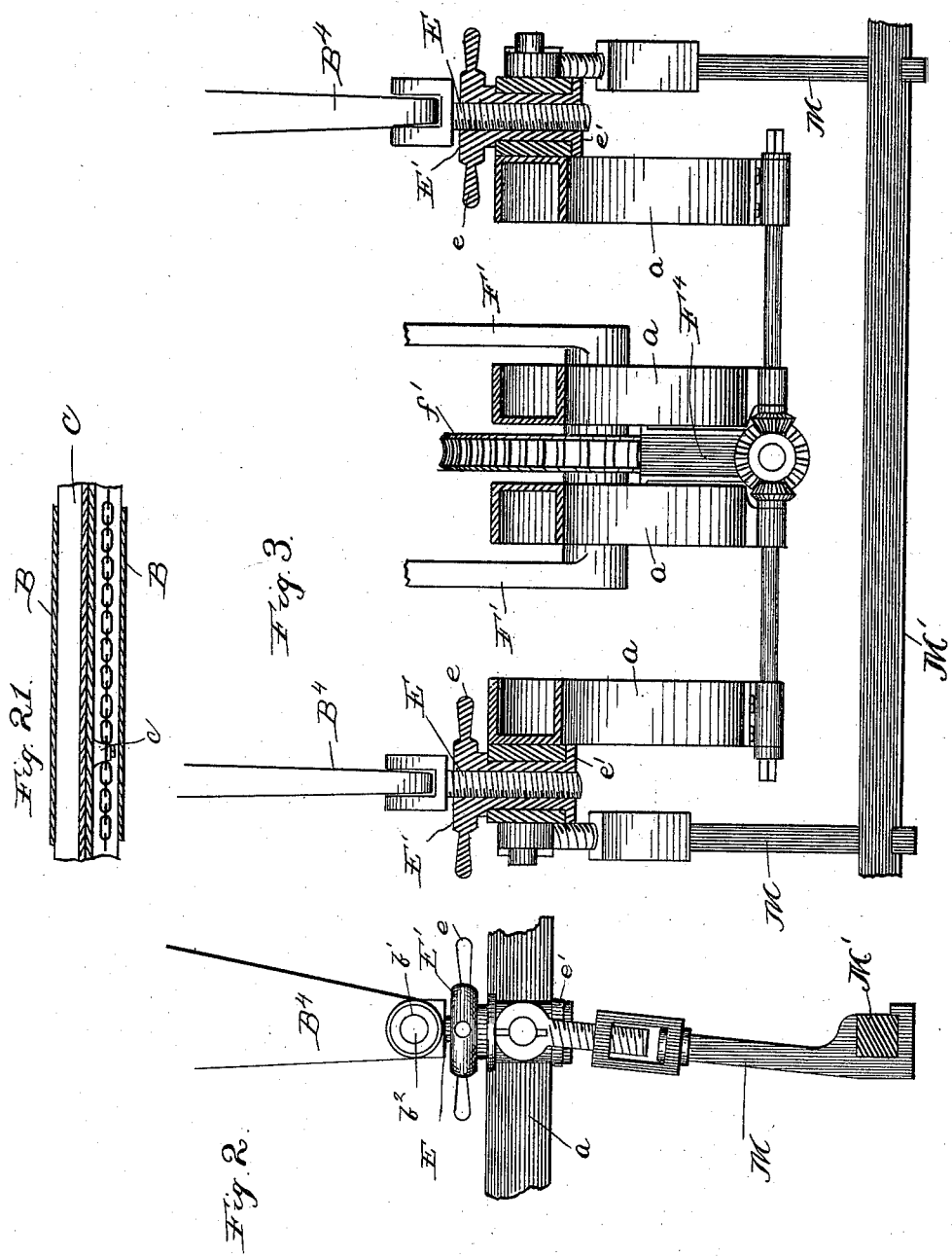

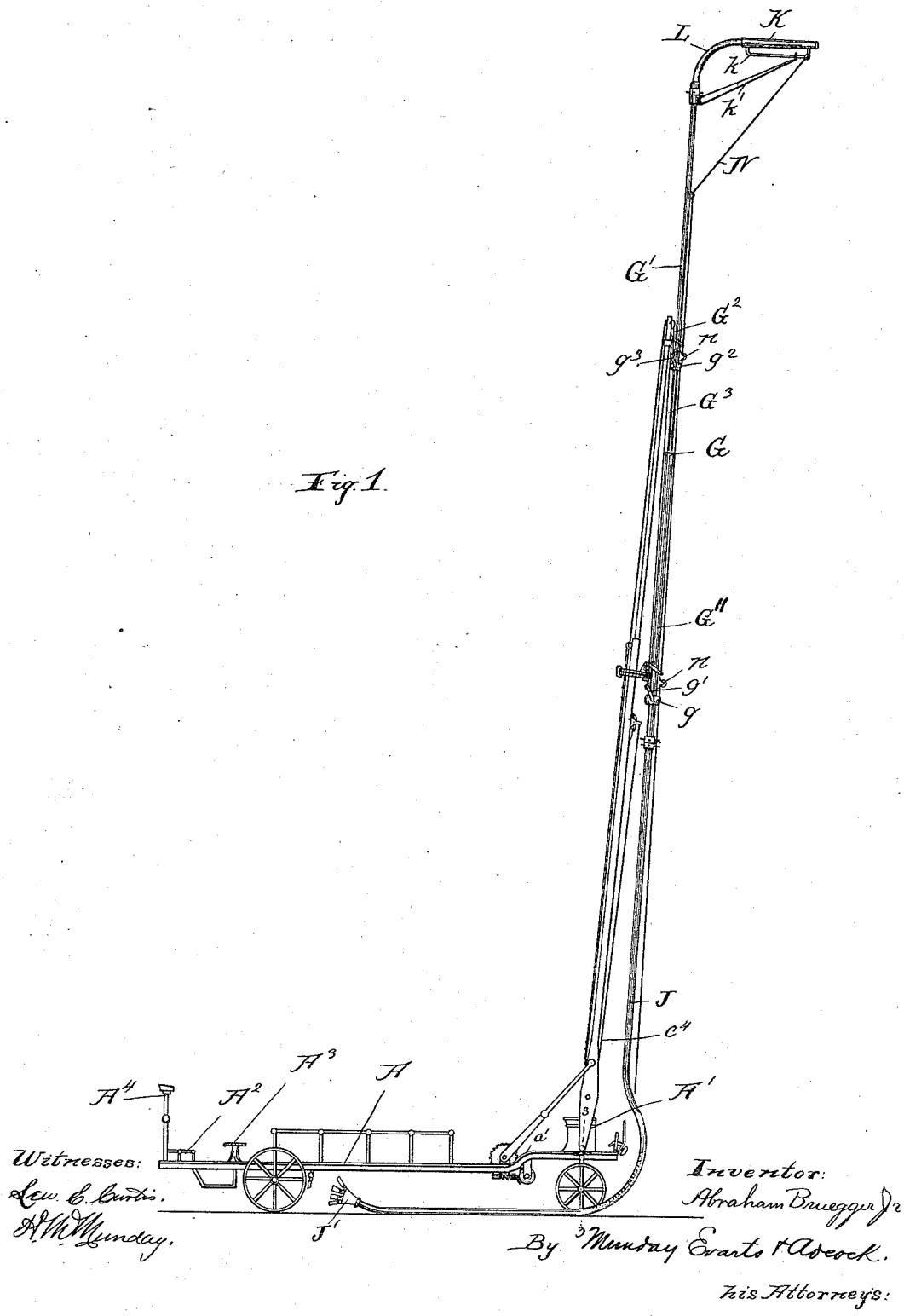

(No Model.) 5 Sheets—Sheet 3.
A. BRUEGGER, Jr.
WATER TOWER TRUCK.
No. 383,699. Patented May 29, 1888.
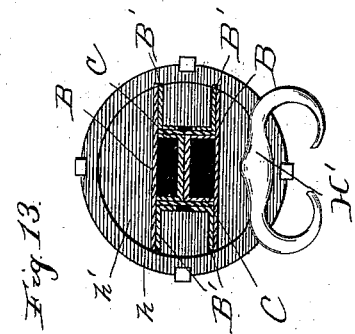
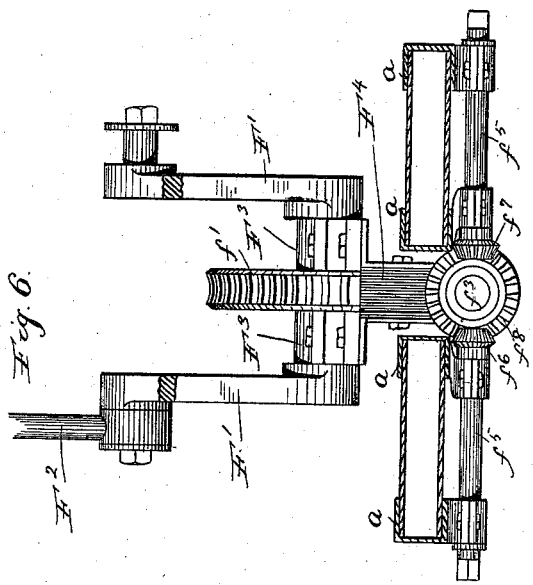
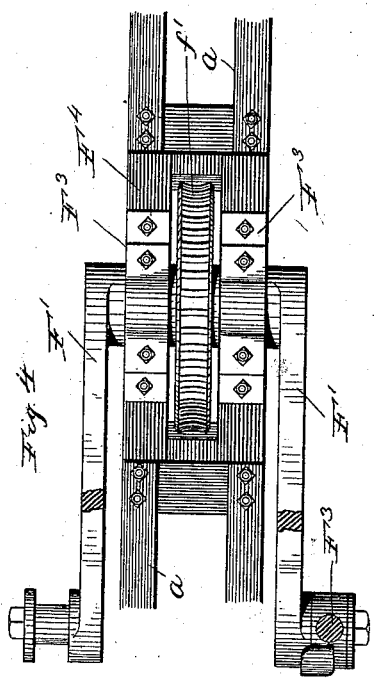
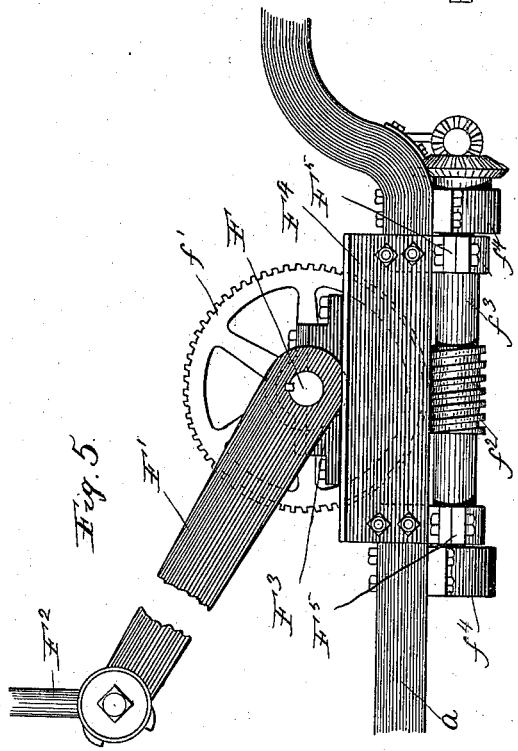
Witnesses:
Lew. C. Burtis.
H. W. Munday.
Inventor:
Abraham Bruegger Jr
By Munday Evarts & Adcock
his Attorneys.

(No Model.) 5 Sheets—Sheet 4.
A. BRUEGGER, Jr.
WATER TOWER TRUCK.
No. 383,699. Patented May 29, 1888.
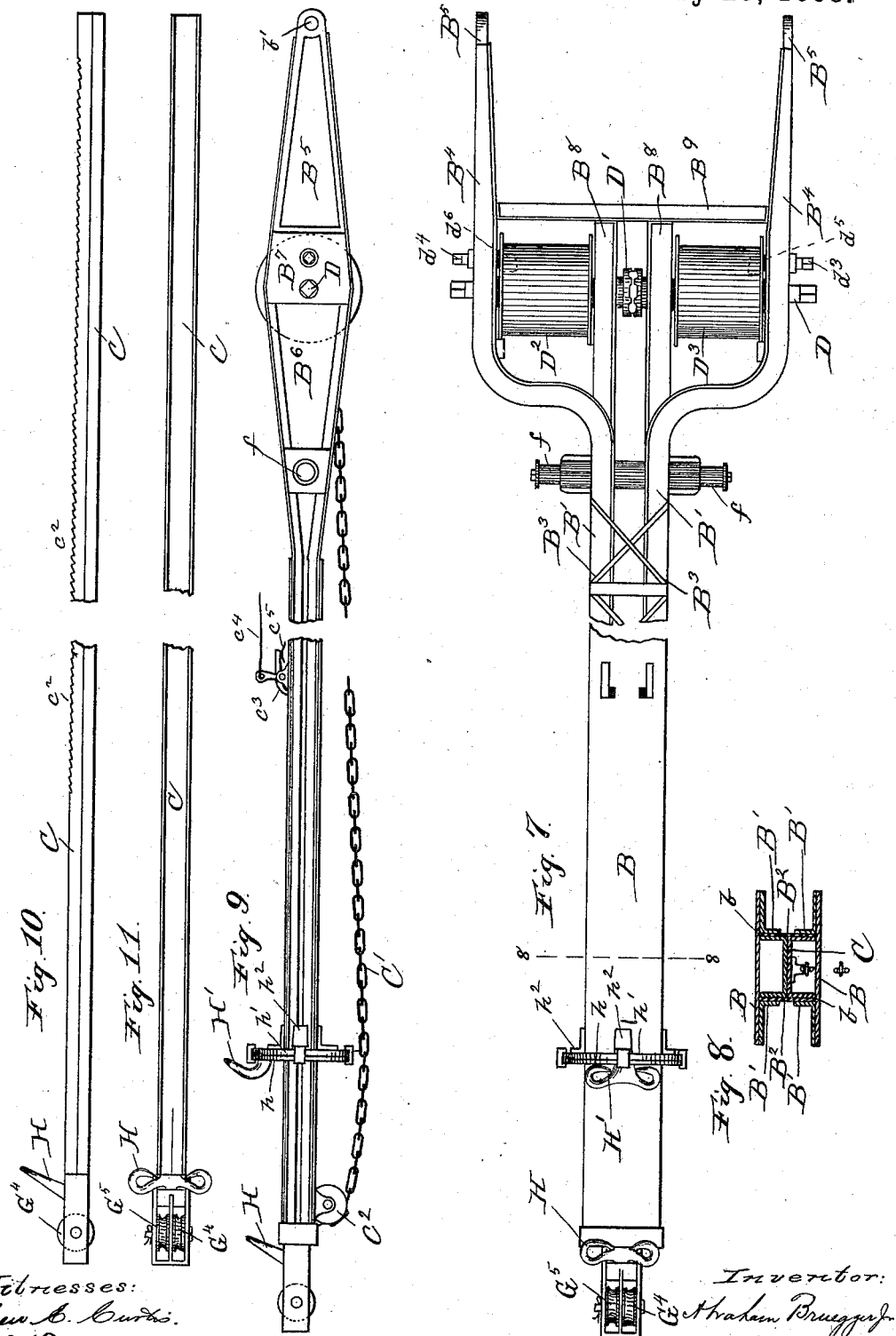
Witnesses:
Geo. C. Curtis.
H. W. Munday.
Inventor:
Abraham Bruegger Jr.
By Munday, Evarts & Adcock
his Attorneys
N. PETERS, Photo-Lithographer, Washington, D. C.

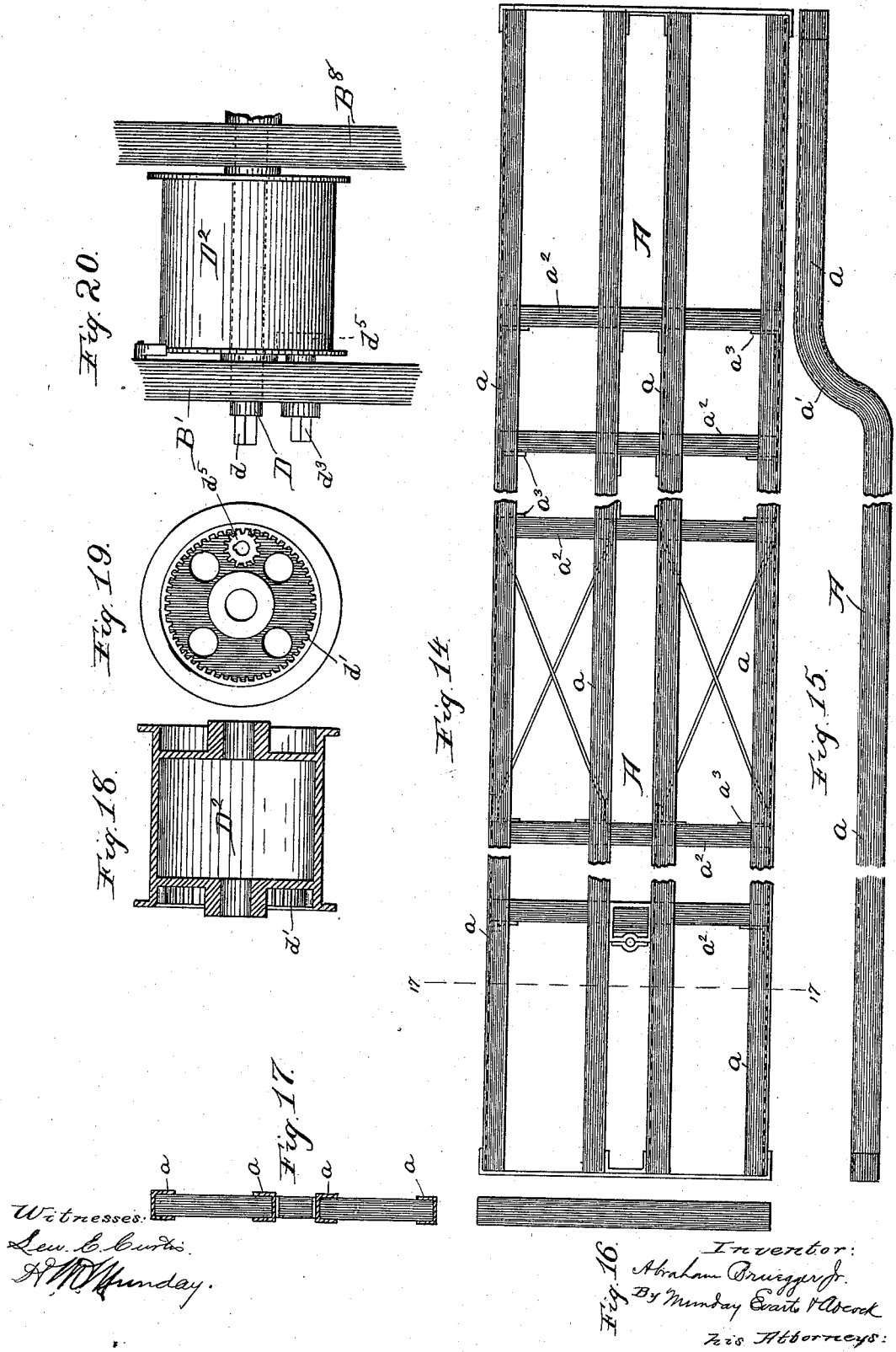

UNITED STATES PATENT OFFICE.

ABRAHAM BRUEGGER, JR., OF CHICAGO, ILLINOIS, ASSIGNOR TO E. BRUCE PRESTON, OF SAME PLACE.

WATER-TOWER TRUCK.

SPECIFICATION forming part of Letters Patent No. 383,699, dated May 29, 1888.

Application filed March 28, 1887. Serial No. 232,658. (No model.)

*To all whom it may concern:*

Be it known that I, ABRAHAM BRUEGGER, Jr., a citizen of the United States, residing in Chicago, in the county of Cook and State of Illinois, have invented a new and useful Improvement in Water-Tower Trucks, of which the following is a specification.

This invention relates to fire-department water-tower trucks, and more particularly to certain improvements upon the water-tower truck shown and described in Patent No. 353,132 granted to George C. Hale, November 23, 1886.

The invention consists in the novel devices and novel combinations of devices herein shown and described, and more particularly pointed out in the claims.

In the accompanying drawings, which form a part of this specification, and in which similar letters of reference indicate like parts, Figure 1 is a side elevation of an apparatus embodying the invention, some of the devices not being shown owing to the smallness of the scale upon which this figure is made. Fig. 2 is an enlarged front view of the front portion of the truck. Fig. 3 is a cross section on line 3 3 of Fig. 1. Fig. 4 is an enlarged plan view of the mechanism for raising the tower or derrick. Fig. 5 is an enlarged side elevation of the same. Fig. 6 is a cross-section showing such mechanism in front elevation. Fig. 7 is an enlarged detail plan view of the tower or derrick. Fig. 8 is a cross section on line 8 8 of Fig. 7, enlarged. Fig. 9 is an enlarged detail side elevation of the tower. Figs. 10 and 11 are detail side elevation and plan views of the telescopic mast. Fig. 13 is a plan view of the swivel-yoke. Fig. 14 is a detail plan view of the truck-frame. Fig. 15 is a detail side elevation of the same, and Fig. 16 a detail end view. Fig. 17 is a section on line 17 17 of Fig. 14. Figs. 18, 19, and 20 are detail views of one of the drums for elevating the water-tower pipe; and Fig. 21 is a longitudinal section of the mast, showing the chain connection.

In said drawings, A represents the truck-frame, consisting of four longitudinal channel-bars, $a$, having a curve, $a'$, therein to form the elevated front portion of the truck over the front wheels, and connected together by cross channel-bars $a^2$ $a^2$ through the angle-plates $a^3$ $a^3$, said longitudinal and transverse channel bars and plates being firmly riveted or bolted together.

The front portion of the truck-frame is furnished with a driver's seat, A', and the rear portion with a wheelman's seat, A², and the usual steering mechanism, A³, and also a standard or platform, A⁴, for the free end of the tower to rest upon when the same is lowered for transportation.

The tower or derrick consists, preferably, of two flat plates or bars, B B, four angle-bars, B' B', and two flat plates or bars, B² B², at right angles to the plates B B, all riveted firmly together, as clearly indicated in Fig. 8. By making the tower thus of angle-bars and plates an interior channel or guideway, $b$, is formed for the sliding mast C, while at the same time, owing to its hollow form, the tower is given a very strong, stiff, and rigid as well as light construction. At the lower part of the tower braces B³ B³ are substituted for the top and bottom plates, B B. These cross-braces B³ B³ are riveted or bolted to the angle-bars B' B' the same as the plates B B. Near the lower end of the tower the angle-bars B' B' are curved and spread apart horizontally, as clearly indicated in Fig. 7, to form two forks or legs, B⁴ B⁴, for pivoting the tower to the truck, and also to give room for the water-pipe-elevating drums and the mast-elevating wheel between them. The angle-bars B' B' are also spread apart laterally, as indicated in Fig. 9, to give additional strength to the lower end of the tower, and also additional room for the drum-shaft D or its bearing.

The two pivotal ends of the forked tower are furnished with separate pivot bars or blocks B⁵ B⁵, preferably of a triangular flanged form, as indicated in Fig. 9, which are embraced between the vertically-separated angle-bars B' B' and securely riveted or bolted thereto. The holes or bearings $b'$ for the pivot-pin $b^2$ of the tower are made in these triangular flanged bars B⁵ B⁵, which may be preferably of cast metal. The vertically bowed or spread angle-bars B' B' are further braced and strengthened at this lower end of the tower by the wide triangular plates $B^6$, one on each side, and by the bearing plates or bars $B^7$ $B^7$, which are bolted or secured thereto.

D is a shaft journaled in the bearing-plates $B^7$ $B^7$, which carries the sprocket or chain wheel $D'$ for elevating the mast C, and upon which the winding-drums $D^2$ $D^3$ for elevating the water-pipe are journaled or loosely mounted. The shaft D and the sprocket-wheel $D'$, secured rigidly thereto, are revolved or operated by a crank which fits upon the square ends $d$ of the shaft. The drums $D^2$ $D^3$ are furnished with interior toothed gears, $d'$, and are operated by the crank-shafts $d^3$ $d^4$, which have gears $d^5$ $d^6$ meshing with the gears $d'$ $d^2$. The shaft D and drums $D^2$ $D^3$ are further supported and kept in place by the division channel-bars $B^8$ $B^8$ and the cross channel-bar $B^9$, which also serves as a brace to strengthen and stiffen the lower forked ends of the tower. The forked ends of the tower are not pivoted directly to the truck-frame, but to vertically-adjustable screws E E, mounted in rotary threaded sleeves $E'$ $E'$, journaled on the truck-frame. The sleeves $E'$ $E'$ are furnished with handles $e$ $e$ for turning the same and with collars or flanges $e'$ $e'$ to keep them in place.

The tower is elevated or lowered by means of a crank-shaft, F, and cranks $F'$ $F'$, rigidly secured thereto, which are connected by pivotal links $F^2$ $F^2$ with the tower, the tower being furnished with a transverse pin or shaft, $f$, to which the links $F^2$ $F^2$ are directly pivoted. The cranks or arms $F'$ $F'$ of the crank-shaft F are rigidly keyed to the shaft F, as clearly indicated in the drawings at Fig. 5. The crank-shaft F is furnished with a gear, $f'$, which is driven by a worm, $f^2$, on the longitudinal shaft $f^3$. The shaft $f^3$ is journaled in suitable bearings, $f^4$, secured to the truck-frame, and is operated by the crank-shafts $f^5$ $f^5$, which are provided with bevel-gears $f^6$ $f^7$, which mesh with bevel-gear $f^8$ on the worm-shaft $f^3$. The crank-shaft F is journaled in suitable bearings, $F^3$, which are secured to a laterally rocking or swinging bracket or housing, $F^4$, so that when the tower is tilted in respect to the truck-frame by the adjusting-screws E E, in order to plumb the same, the crank-shaft F, by means of its laterally-swinging bracket or housing $F^4$, may accommodate itself to the changed position of the tower, and thus raise the same without any binding or twisting strain. The housing or bracket $F^4$ may preferably be pivoted to the longitudinal shaft $f^3$. $F^5$ $F^5$ represent the boxes or journals pivotally connecting the housing $F^4$ to the shaft $f^3$.

The mast C is constructed of two channel-bars riveted together, as is clearly indicated in Figs. 8, 10, and 11. The mast reciprocates or telescopes within the tower B or the guideway $b$ therein.

The mast C, is raised and lowered by means of an endless chain or cable, $C'$, which travels upon the sprocket-wheel $D'$ on the crank-shaft D at the lower end of the tower and a similar sprocket-wheel, $C^2$, near the upper end of the tower. This chain is connected to the mast, near the lower end thereof, and, preferably, about six feet from such lower end, by means of a hook, bolt, or other fastening, $c$. By turning the crank-shaft D the mast C may be readily raised or lowered. The edges of one of the channel-bars C of the mast are furnished with ratchet-teeth $c^2$, and the tower B is furnished, near its upper end, and preferably about five feet therefrom, with a pivoted spring-pawl, $c^3$, which is provided with a cord, $c^4$, extending to the ground. As the mast is elevated the spring $c^5$ will cause the pawl to engage the teeth on the mast and thus hold the same and relieve the chain $C'$ of its weight. When the mast is being lowered, the pawl $c^3$ will be held out of engagement with the ratchet by the cord $c^4$.

G represents a water-pipe preferably made in two sections fitted together at their ends. The upper section, $G'$, of this pipe may, preferably, be about three and-one-half-inch iron pipe, and the lower or larger section, $G''$, about a four-inch pipe. The pipe G is furnished near its lower end with a swivel, $g$, provided with a bail, $g'$, and the upper section, $G'$, of the pipe is furnished with a similar swivel, $g^2$, and bail $g^3$. The swivel-rings $g$ and $g^2$ are connected to the pipes in any suitable way, so that they cannot slide thereon, but allow the pipes to swivel or turn freely in the rings. The water-pipe G is raised or lowered by means of two cables, $G^2$ $G^3$, one connected to the bail $g'$ near the lower end of the pipe, and the other connected to the upper bail, $g^3$. These cables pass over the two pulleys $G^4$ $G^5$ at the upper end of the mast C, and thence around the winding-drums $D^2$ $D^3$ on the shaft D. By turning the crank-shafts $d^3$ $d^4$ the cables $G^2$ $G^3$ are wound up around the drums and the pipe G raised or lowered, as may be desired.

The mast C is also furnished, near its upper end, with a yoke, H, and the tower B is furnished with a similar yoke, $H'$, which is secured to a swivel-ring, $h$, mounted to rotate on a guide-ring, $h'$, secured by suitable brackets, $h^2$, to the tower. The pipe G is guided by these yokes H $H'$. The upper yoke, H, is secured rigidly to the mast near its end. By reason of the swiveling motion of the lower guide-yoke, $H'$, the pipe G may be easily swayed or inclined laterally. When the pipe G is supported in both the upper and lower guide-yokes, it may be swayed or inclined to a limited extent, the motion then being about the upper rigid yoke as a pivot, and the extent of movement being governed by the limits of the swiveling motion of the ring $h$ on the guide-ring $h'$. By placing the guide-yokes H and $H'$ closer together or farther apart the extent of inclination given to the pipe G while it is supported in both yokes may be made greater or less. When the pipe G is disengaged from the upper yoke, H, its motion will then take place about the lower or swiveling yoke, $H'$, as a pivot, and it may then be freely inclined to any desired extent. To the lower end of the pipe G the hose J is coupled. The lower end of the hose J is furnished with the usual two, three, four, or more way-couplings, J', so that the streams from several engines may be combined together.

The pipe G is furnished at its upper end with a nozzle, K, connected by a flexible hose, L, thereto. The nozzle K has a guide-rod, k, extending nearly its whole length, which guide-rod is connected by a pivotal sliding arm, k', to the upper end of the pipe G. A rope or line, N, is attached near the end of the nozzle and extends through suitable guide-rings or pulleys, n n, to the ground. The force of the stream issuing through the nozzle tends to straighten the flexible section L, and by means of the cord or rope N the nozzle may thus be pointed at any desired vertical angle or elevation. The yokes H H' are of such form, as indicated clearly in Fig. 13, that the pipe G may be swung from one arm or branch of the yoke to the other, or entirely disengaged from the yoke when desired. By disengaging the pipe from the upper yoke and supporting its upper end by the cable attached to the upper bail the pipe may be easily turned or pointed in any desired direction or swung to any desired point—as from one window of a building to another—by moving or manipulating the lower end of the hose-pipe at the ground; or, without disengaging the pipe from the upper yoke, the nozzle may be moved or adjusted within reasonable limits by simply swinging the lower or swiveling yoke, H', from side to side on the tower. The weight of the pipe G may from time to time be supported entirely by the cable which is secured near its top, or by the cable which is secured near its lower end, as may be required for adjusting the nozzle or swinging the pipe. By employing two pipe-supporting cables, one attached near the lower end of the pipe and one above, the pipe may not only be given a greater extent and variety of adjustments, but it is also better balanced and may be more steadily and firmly held in any desired position. The two cables with the two drums and two cranks also afford additional means for raising or lowering the water-pipe.

Adjustable clips M are pivoted to the frame A on each side to attach the frame firmly to the axle M' at the front end of the truck.

That feature of the invention which consists, in connection with the vertically-adjustable pivots of the tower or derrick, of the swiveling connection between the truck-frame and the mechanism for raising and lowering the tower, so that such raising and lowering mechanism may automatically adjust or adapt itself to any particular position of the adjustable pivots of the tower, is obviously independent of the particular form or kind of raising and lowering mechanism employed, and whether also the pivotal frame to be raised is a water tower or derrick, or a ladder, fire-escape, or other like equivalent structure. So far as this feature of the invention is concerned, any suitable form or kind of raising and lowering mechanism may be employed—such, for example, as the various raising and lowering mechanisms shown and described in the numerous prior patents upon water-towers, ladder-trucks, &c., and which are well-known to those skilled in the art to which this improvement relates. It is also desired to be distinctly understood that that feature of the invention which consists, in connection with the water-pipe, of the duplicate cables by which it is supported and suspended, one attached near its lower end and one at a point above, is also independent of the particular construction or kind of tower and mast employed and cable-winding mechanism which may be employed.

I claim—

1. The combination, with a truck-frame, of a tower or derrick having vertically-adjustable pivots connecting the same to said truck-frame, and mechanism for raising and lowering said tower or derrick, having a pivoted connection with said truck-frame to enable such raising and lowering mechanism to automatically adjust or adapt itself to the position of the tower or derrick, substantially as specified.

2. The combination, with a truck and water-tower, of a water-pipe suspended from said tower, and two cables connected to said water-pipe, one near its lower end and one above, for suspending and directing the water-pipe, said water-pipe being suspended wholly by said cable, and two guides for said pipe, either one or both of which may be used in directing the pipe, substantially as specified.

3. The combination of a truck, a pivoted tower, an extensible mast having two pulleys near its upper end, a suspended water-pipe, and two cables connected to said pipe at different points for suspending and directing the same, two winding drums for operating said cables, and two guides for said pipe, either one or both of which may be used in directing the pipe, substantially as specified.

4. The combination of a truck, a pivoted tower, an extensible mast having two pulleys near its upper end, a suspended water-pipe, and two cables connected to said pipe at different points for suspending and directing the same, two winding-drums for operating said cables, said cables having a swivel-connection with said pipe, and two guides for said pipe, either one or both of which may be used in directing the pipe, substantially as specified.

5. The combination of a truck, a pivoted tower, an extensible mast having two pulleys near its upper end, a suspended water-pipe, and two cables connected to said pipe at different points for suspending and directing the same, two winding-drums for operating said cables, said cables having a swivel-connection with said pipe, and a guide-yoke, H, near the top of said mast, and a second guide-yoke, H', near the top of said tower, substantially as specified.

6. The combination of a truck, a pivoted tower, an extensible mast having two pulleys near its upper end, a water-pipe and two cables connected to said pipe at different points, and two winding-drums for operating said cables, said cables having a swivel connection with said pipe, a guide-yoke, H, near the top of said mast, and a swiveling guide-yoke, H', near the top of said tower, substantially as specified.

7. The combination, with tower and mast, of a water-pipe, a cable for suspending said water-pipe from the top of said mast, and a swiveling guide-yoke mounted on said tower near the top thereof, substantially as specified.

8. The combination, with tower and mast, of a water-pipe, two cables for suspending said water-pipe from the top of said mast, and a swiveling guide-yoke mounted on said tower near the top thereof, and a second guide-yoke near the top of said mast, substantially as specified.

9. The combination, with a truck, of a pivoted tower, an extensible mast, a cable-suspended water-pipe, and two guide-yokes for said water-pipe, one near the top of said mast and one near the top of said tower, nozzle K, flexible hose L, guide-rod $k$, pivotal arm $k'$, and cord or line N, substantially as specified.

10. The combination, with a truck, of a hollow straight pivoted tower consisting of plates B B, angle-plates B' B' B' B', and plates $B^2$ $B^2$, raising and lowering mechanism connecting said pivoted tower, and truck for raising and lowering the tower and holding it in different positions, and a telescopic mast fitting in the interior channel or guideway of said hollow tower, substantially as specified.

11. The combination, with a truck, of a pivoted tower consisting of flat plates and angle-plates riveted together to form an interior channel or guideway, and a telescopic mast consisting of a pair of channel-bars riveted together, back to back, substantially as specified.

12. The combination, with a truck, of a pivoted tower consisting of flat plates and angle-plates riveted together to form an interior channel or guideway, and a telescopic mast consisting of a pair of channel-bars riveted together back to back, and a chain or cable for elevating said mast secured thereto and fitting or moving in the hollow space or channel in one of said channel-bars, substantially as specified.

13. The combination, with a truck, of a pivoted tower consisting of angle bars and plates riveted together, said angle-bars being parallel to each other at the upper portion of the tower, and the angle-bars at the opposite edges of the tower being curved apart and forming two divergent arms at the lower end of the tower for pivoting the same to the truck, each of said divergent arms being formed of two curved angle-bars which are spread apart from each other in a plane transverse to the plane of the tower, substantially as specified.

14. The combination, with a truck, of a pivoted forked tower consisting of angle-bars B' B' B' B' and plates $B^2$ $B^2$ riveted together, the angle-bars at the opposite edges of the tower being curved apart in the plane of the tower, forming two divergent curved arms, $B^4$ $B^4$, at the lower end of the tower for pivoting the same to the truck, each of said divergent arms $B^4$ $B^4$ being formed of two of said curved angle-bars spread apart from each other in a plane transverse to the plane of the tower, pivot-pieces $B^5$ $B^5$, embraced between and secured to said transversely-spread curved angle-bars at the ends thereof, angle-plates $B^6$ and journal-plates $B^7$, secured to said transversely-spread curved angle-bars, division-bars $B^8$ $B^8$, extending between and parallel to said divergent arms $B^4$ $B^4$, transverse brace-bar $B^9$, to which the ends of said division-bars are secured, crank-shaft D, and winding-drums $D^2$ $D^3$, mounted upon and between said divergent arms and division-bars, substantially as specified.

15. The combination, with a truck, of a pivoted forked tower consisting of angle-bars B' B' B' B' and plates $B^2$ $B^2$ riveted together, the angle-bars at the opposite edges of the tower being curved apart in the plane of the tower, forming two divergent curved arms, $B^4$ $B^4$, at the lower end of the tower for pivoting the same to the truck, each of said divergent arms $B^4$ $B^4$ being formed of two of said curved angle-bars spread apart from each other in a plane transverse to the plane of the tower, pivot-pieces $B^5$ $B^5$, embraced between and secured to said transversely-spread curved angle-bars at the ends thereof, angle-plates $B^6$, and journal-plates $B^7$, secured to said transversely-spread curved angle-bars, division-bars $B^8$ $B^8$, extending between and parallel to said divergent arms $B^4$ $B^4$, transverse brace-bar $B^9$, to which the ends of said division-bars are secured, crank-shaft D and winding drums $D^2$ $D^3$, mounted upon and between said divergent arms and division-bars, a telescopic mast, C, mounted on said tower, chain C', and sprocket-wheels for operating said mast from said crank-shaft D, water-pipe G, and cables $G^2$ $G^3$, operated from said drums $D^2$ $D^3$, for suspending said water-pipe, substantially as specified.

16. The combination of a truck and a pivoted tower, a telescopic mast and a water-pipe, a chain for raising the mast, a pair of cables for suspending the pipe, a crank-shaft journaled upon said tower near its lower end, having sprocket-wheel D' secured rigidly thereto, and winding-drums $D^2$ $D^3$, journaled loosely thereon, and crank-shafts $d^3$ $d^4$, for operating said drums, substantially as specified.

17. The combination, with a water-tower and a cable-suspended water-pipe, of a swiveling guide-yoke for said pipe, substantially as specified.

18. The combination, with a water-tower and a cable-suspended water-pipe, of a guide-yoke for said pipe, upper ring, $h$, and a circular ring or guideway, $h'$, for said guide-yoke to swivel upon, mounted upon said tower, substantially as specified.

19. The combination, with a truck, of a tower or structure mounted thereon, a pivot or shaft pivotally connecting said tower or structure with the truck, horizontal rotary shaft F, mounted on said truck and extending transversely across the same back of and parallel to the pivot of said tower or structure, crank-arm $F'$, secured rigidly to said shaft F, and connecting-link $F^2$, pivoted at one end to said crank-arm and at its other end to said pivoted tower or structure, said arm $F'$ and link $F^2$ together constituting a toggle connecting the said fixed shaft F with the ladder, substantially as specified.

20. The combination, with a truck, of a pivotal tower or structure mounted thereon, a pivot or shaft pivotally connecting said tower or structure with said truck, horizontal shaft F, mounted on said truck and extending transversely across the same back of and parallel to the pivot of said tower or structure, crank-arm $F'$, secured rigidly to said shaft F, and connecting-link $F^2$, pivoted at one end to said crank-arm and at its other end to said pivoted tower or structure, worm-shaft $f^3$, having worm $f^2$, said shaft F having a gear, $f'$, meshing with said worm $f^2$, said arm $F'$ and link $F^2$ together constituting a toggle connecting the said fixed shaft F with the ladder, substantially as specified.

21. The combination, with a truck, of a pivoted tower or structure mounted thereon, a shaft, F, crank-arm $F'$, and pivoted link $F^2$ for raising the same, said shaft having a gear, $f'$, and a worm, $f^2$, said shaft F being journaled on a laterally swinging or swiveling housing, $F^4$, substantially as specified.

22. The combination, with truck A, of a pivoted tower or structure, B, mounted thereon, the pivots of said tower being vertically adjustable on said truck, shaft F, having crank-arm $F'$ secured thereto, pivoted link $F^2$, connecting said crank-arm and tower, worm-gear $f'$ secured to said shaft F, shaft $f^3$, having worm $f^2$, meshing with said gear $f'$, and block or housing $F^4$, pivotally connected to said shaft $f^3$, said shaft F being journaled on said block $F^4$, substantially as specified.

23. The combination, with truck A, of a pivoted tower or structure, B, mounted thereon, the pivots of said tower being vertically adjustable on said truck, shaft F, having crank-arm $F'$ secured thereto, pivoted link $F^2$, connecting said crank-arm and tower, worm-gear $f'$, secured to said shaft F, shaft $f^3$, having worm $f^2$ meshing with said gear $f'$, and a block or housing, $F^4$, pivotally connected to said shaft $f^3$, said shaft F being journaled on said block $F^4$, and shafts $f^5$ $f^5$, connected by bevel-gears with said shaft $f^3$, substantially as specified.

ABRAHAM BRUEGGER, Jr.

Witnesses:
H. M. MUNDAY,
EDMUND ADCOCK.